J. H. Williams,
Bird Cage.

No. 90,906.  Patented June 1, 1869.

Witnesses
Ernest F. Kastenhuber
C. Wahlers.

Inventor.
John H. Williams
per
Von Santvoord & Hauff
Attys.

United States Patent Office.

JOHN HARVEY WILLIAMS, OF NEW YORK, N. Y.

Letters Patent No. 90,906, dated June 1, 1869.

---

IMPROVED ROD FOR THE CONSTRUCTION OF BIRD-CAGES.

---

The Schedule referred to in these Letters Patent and making part of the same.

---

*To all whom it may concern:*

Be it known that I, JOHN HARVEY WILLIAMS, of the city, county, and State of New York, have invented a new and useful Improvement in Non-Corrosive Rods for Bird-Cage Purposes; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figures 1, 2:
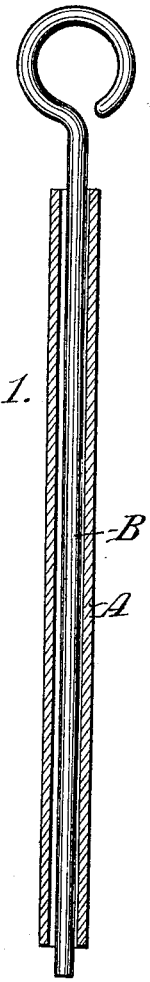
Figure 1 represents a longitudinal section of this invention.
Figure 2 is a transverse section of the same.

This invention consists in a glass tube, either plain or twisted, and combined with a metallic wire or core, passing through its centre and extending beyond its ends, in such a manner that said glass tube, together with its core, can be readily bent to any desired shape, and easily secured in position by means of its metallic core, and that a new article of manufacture is produced, which can be used with great advantage in the construction of bird-cages, toy-houses, trees, or other articles intended for ornaments or toys.

In the drawing—

The letter A designates a glass tube, which may be either plain or twisted, and with a cross-section of any desired form or shape.

Through this glass tube I extend a metallic wire, B, so that the glass tube is strengthened, and that the same can be readily and securely fastened at both ends by means of said metal wire.

If it is desired to bend the glass tube, I heat it at the required spot, and bend it, together with its metallic core, to the required shape.

By these means I have produced a new article of manufacture, which can be used with great advantage in the construction of bird-cages, toy-houses, toy-cars or carriages, trees, chandeliers, or other articles for toys or ornaments.

What I claim as new, and desire to secure by Letters Patent, is—

The non-corrosive rod for bird-cages, consisting of a glass tube having an internal flexible metallic core, combined together as described, as a new article of manufacture.

JOHN HARVEY WILLIAMS.

Witnesses:
W. HAUFF,
ERNEST F. KASTENHUBER.